United States Patent
Nie et al.

(10) Patent No.: US 11,048,262 B2
(45) Date of Patent: Jun. 29, 2021

(54) ROBOT MOVEMENT CONTROL METHOD AND APPARATUS AND ROBOT USING THE SAME

(71) Applicant: UBTECH ROBOTICS CORP LTD, Shenzhen (CN)

(72) Inventors: Peng Nie, Shenzhen (CN); Youjun Xiong, Shenzhen (CN); Xu Hu, Shenzhen (CN); Xiangbin Huang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 254 days.

(21) Appl. No.: 16/435,580

(22) Filed: Jun. 10, 2019

(65) Prior Publication Data

US 2020/0201339 A1    Jun. 25, 2020

(30) Foreign Application Priority Data

Dec. 25, 2018  (CN) .......................... 201811591566.0

(51) Int. Cl.
  *G05D 1/02* (2020.01)
  *G08G 1/00* (2006.01)

(52) U.S. Cl.
  CPC ........... *G05D 1/0214* (2013.01); *G08G 1/207* (2013.01)

(58) Field of Classification Search
  CPC .. G08G 1/207; G05D 1/0214; G05B 19/4061; G05B 2219/33008; G05B 2219/35141; G05B 2219/37631; G05B 2219/39384; G05B 2219/40196; G05B 2219/40478; G05B 2219/42272; G05B 2219/49137; G05B 2219/49138; G05B 2219/49139; G05B 2219/49142; G05B 2219/49157; G05B 2219/49152

See application file for complete search history.

(56) References Cited

U.S. PATENT DOCUMENTS

2017/0322559 A1*  11/2017  Fukuda ................ G05D 1/0088
2020/0150655 A1*  5/2020  Artes .................... G05D 1/0016

FOREIGN PATENT DOCUMENTS

CN        105867364 A    8/2016
CN        109062217 A    12/2018

* cited by examiner

*Primary Examiner* — Jeff A Burke
*Assistant Examiner* — Arslan Azhar (57) ABSTRACT

The present disclosure provides a movement control method for a robot as well as an apparatus and a robot using the same. The method includes: obtaining a starting position and an ending position of the robot, in response to a movement instruction being detected; determining a movement path of the robot based on the starting position and the ending position; obtaining pass qualification information of the robot, if the movement path intersects a line corresponding to a preset virtual wall; and moving the robot to the ending position according to the movement path, if the pass qualification information identifying the robot is allowed to traverse the virtual wall. By obtaining the pass qualification information, the robot can return to the working area from the non-working area in the case of an abnormality, while ensuring that the robot does not actively traverse from the working area to the non-working area.

19 Claims, 9 Drawing Sheets

ROBOT MOVEMENT CONTROL METHOD AND APPARATUS AND ROBOT USING THE SAME

TRAVERSE REFERENCE TO RELATED APPLICATION PROGRAMS

This application claims priority to Chinese Patent Application No. CN201811591566.0, filed Dec. 25, 2018, which is hereby incorporated by reference herein as if set forth in its entirety.

BACKGROUND

1. Technical Field

The present disclosure relates to artificial intelligence technology, and particularly to a movement control method for a robot as well as an apparatus and a robot using the same.

2. Description of Related Art

In the process of autonomous navigation of a robot, the moving route of the robot will be limited and ruled by setting a virtual wall. Once the virtual wall is set, the robot cannot be moved to another area on the other side of the virtual wall, so that the robot can be restricted to move only in a working area and cannot be moved to a non-working area. However, due to measurement errors of the sensor or changes in the working environment, the accuracy of the real-time localization information of the robot will be affected and cause the robot to actively move from the working area to the non-working area. When the actual position of the robot is in the working area and is near to the virtual wall, the obtained localization may also offset to the non-working area which is on the other side of the virtual wall. At this time, since the robot cannot be move to the area on the other side of the virtual wall (i.e., the non-working area), the robot cannot be moved when a movement instruction is received. In addition, if the robot is manually moved to the non-working area, the robot cannot return to the working area due to the existence of the virtual wall. The above-mentioned situation will result in low efficiency and low reliability of the autonomous navigation of the robot.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions of the present disclosure, the following describes through specific embodiments.

Figure 1:
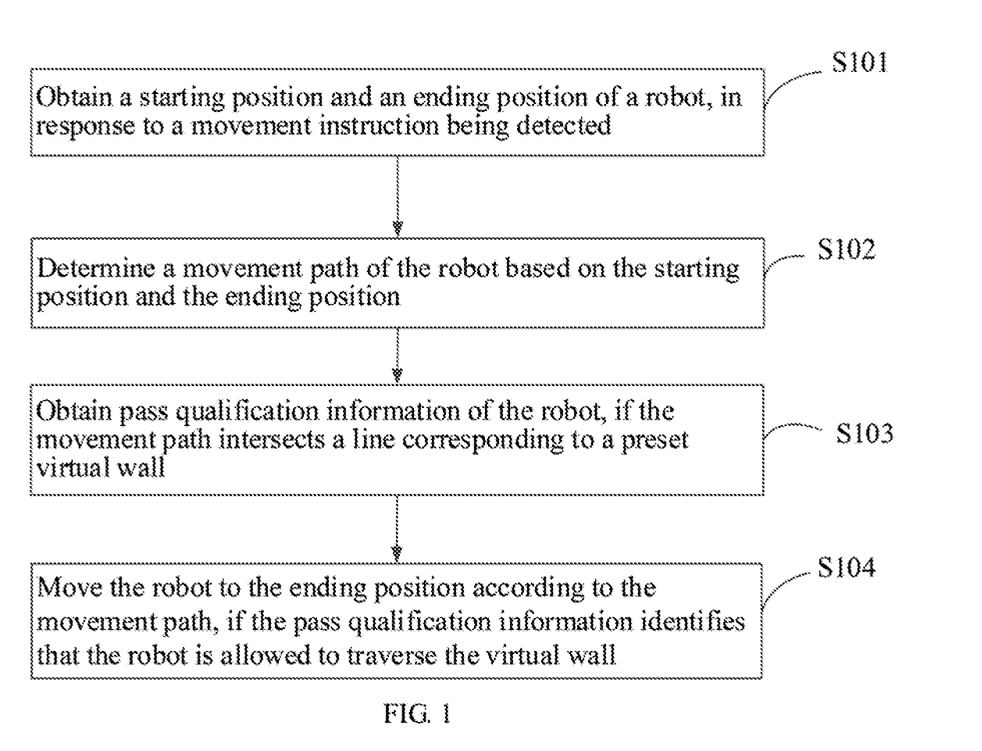
FIG. 1 is a flow chart of an embodiment of a movement control method for a robot according to the present disclosure.
Figure 8:
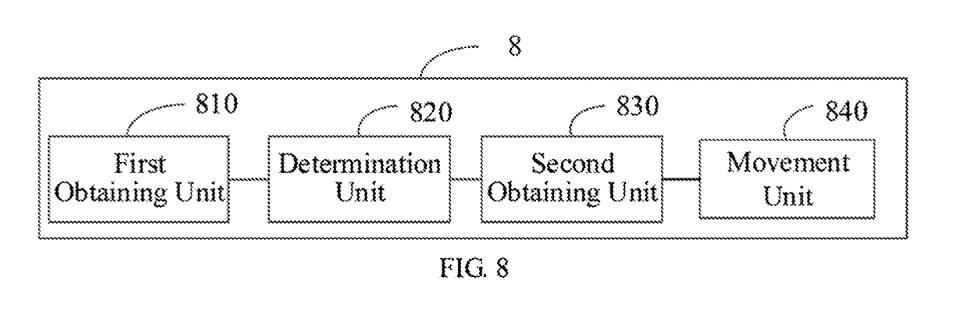
FIG. 8 is a schematic block diagram of an embodiment of a movement control apparatus for a robot according to the present disclosure.
Figure 9:
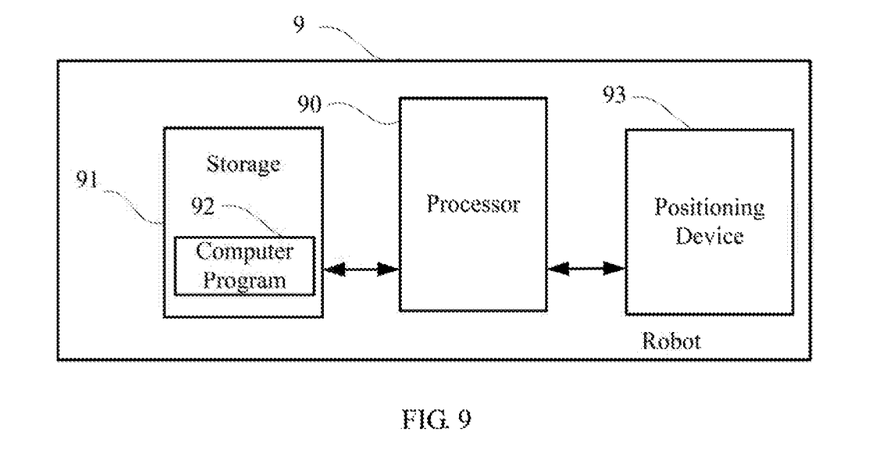
FIG. 9 is a schematic block diagram of an embodiment of a robot according to the present disclosure.

FIG. 1 is a flow chart of an embodiment of a movement control method for a robot according to the present disclosure. In this embodiment, a movement control method for a robot is provided. The method is a computer-implemented method executable for a processor, which may be implemented through and applied to a movement control apparatus as shown in FIG. 8 that is for a robot having a positioning device or a robot as shown in FIG. 9 that has a positioning device, or implemented through a storage medium. The positioning device may be UWB (ultra-wideband) tag or other type of positioning device which is capable of positioning the robot. As shown in FIG. 1, the method includes the following steps.

S101: obtaining a starting position and an ending position of the robot, in response to a movement instruction being detected.

The starting position is obtained via the positioning device of the robot. In this embodiment, it detects by, for example, the movement control apparatus of FIG. 8 or the robot of FIG. 9 that there is a movement instruction including the ending position. The movement instruction may be a movement instruction transmitted by a user remotely to the robot, or may be a movement instruction obtained by analyzing an operation instruction after the robot receives the operation instruction. For instance, when the operation instruction for room cleaning is received by a sweeping robot, the sweeping robot can analyze the operation instructions for room cleaning to obtain the movement instruction.

The robot is located through the positioning device to obtain the starting position of the robot. The common localization method is realized by selecting three fixed positions in the working environment of the robot to dispose positioning anchor points while dispose a tag node on the robot so as to measure the distances between the robot and the three positioning anchor points, and then determining the location of the robot according to a spatial coordinate relationship, so as to realize the localization of the robot and obtain the current starting position of the robot. Those skilled in the art can understand that, the method for obtaining the current starting position of the robot herein is not limited to the above-mentioned localization method.

Since the movement instruction includes the ending position, it obtains the ending position from the movement instruction.

S102: determining a movement path of the robot based on the starting position and the ending position.

Since the starting position and the ending position are known, the movement path from the starting position to the ending position can be planned based on a path planning algorithm. In which, the path planning algorithm may be the A* algorithm, the D* algorithm, or the like, which is not limited herein.

The A* algorithm, that is, the A-star algorithm is the most effective direct searching method for solving shortest paths in static road networks, and is also an effective algorithm for solving many search problems. The closer the estimated distance value in the algorithm is to the actual value, the faster the search speed. Its formula is expressed as: f(n)=g(n)+h(n), where f(n) is the estimated distance from an initial node via a node n to an target node, g(n) is the actual distance from the initial node to the node n, and h(n) is the estimated distance of the optimal path from the node n to the target node.

The D* algorithm is very efficient in finding paths in a dynamic environment. During moving to the target node, it only checks the changes of the next node or neighboring nodes on the shortest path.

Figure 2:
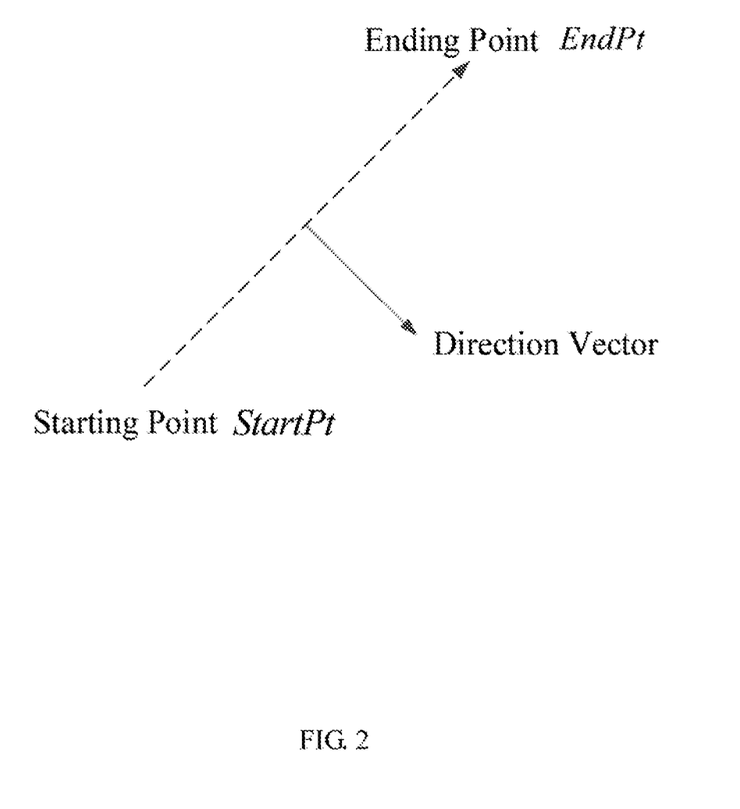
FIG. 2 is a schematic diagram of a movement path unit according to an embodiment of the present disclosure.

The obtained movement path can be described through a point set on a map. In which, the movement path may include a plurality of movement path units. FIG. 2 is a schematic diagram of a movement path unit according to an embodiment of the present disclosure. As shown in FIG. 2, a movement path unit is a line composed of two points of a starting point and an ending point. The starting position is the position of the starting point, and the ending position is the position of the ending point. Each movement path unit contains two endpoints (i.e., the starting point and the ending point) and a state vector for indicating a direction of the movement path unit. The mathematical model of each movement path unit is as follows:

$$\bar{t} = \{StartPt, EndPt, Dir\}$$

where, StartPt is the starting point of the line of the movement path unit, EndPt is ending point of the movement path unit, and Dir is the direction vector of the movement path unit. A vertical normal of the line which is vertical to the line is made along a middle point of the line of the movement path unit, and the direction of the line from the starting point to the ending point of the movement path unit is defined. If the direction of the normal is clockwise with respect to the direction of the line, Dir is defined as positive; otherwise, Dir defined as negative. That is, Dir is the unit vector which passes through the ending point of the line and is perpendicular to the line.

The movement path is a set of the movement path units, which is represented as:

$$T = \{\bar{t}_i | i \in N\}$$

S103: obtaining pass qualification information of the robot, if the movement path intersects a line corresponding to a preset virtual wall, where the preset virtual wall is for separating a preset working area from a non-working area, and the pass qualification information is for identifying whether the robot is allowed to traverse the virtual wall.

Figure 3:
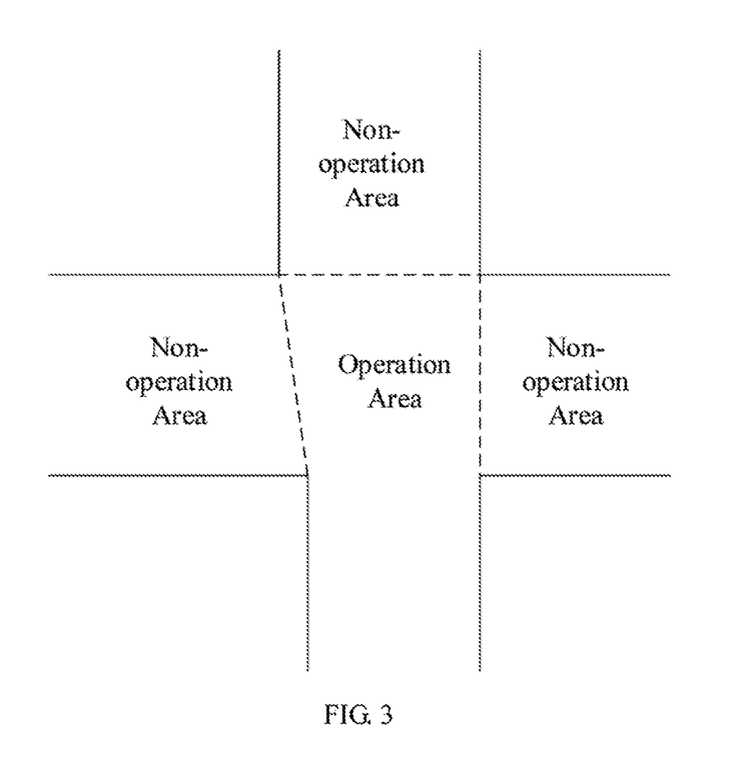
FIG. 3 is a schematic diagram of a virtual wall, a working area, and a non-working area according to an embodiment of the present disclosure.

It sets the virtual wall in advance. It receives the instruction for setting the virtual wall, and sets the virtual wall in advance according to the instruction for setting the virtual wall. FIG. 3 is a schematic diagram of a virtual wall, a working area, and a non-working area according to an embodiment of the present disclosure. As shown in FIG. 3, the dotted line is a virtual wall which divides a map into a working area and a non-working area. In which, the instruction for setting the virtual wall can be produced by a user to use a virtual wall brush tool to draw the virtual wall on a map layer in a map editing application (APP), and the drawing can be performed by the method as drawing a picture, and the shape of the drawn virtual wall may be a straight line or a curved line. The line corresponding to the preset virtual wall may be closed or unclosed.

Figure 4:
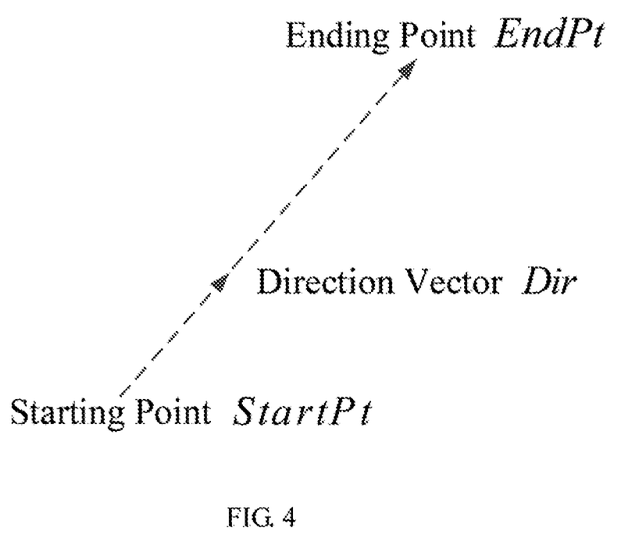
FIG. 4 is a schematic diagram of a virtual wall unit according to an embodiment of the present disclosure.

The virtual wall may include a plurality of virtual wall units. FIG. 4 is a schematic diagram of a virtual wall unit according to an embodiment of the present disclosure. As shown in FIG. 4, the virtual wall unit is a line composed of two points of a starting point and an ending point, and each virtual wall unit contains two endpoints (i.e., the starting point and the ending point) and a state vector for indicating a direction of the virtual wall unit. The mathematical model of each virtual wall unit is as follows:

$$\bar{w} = \{StartPt, EndPt, Dir\}$$

where, StartPt is starting point of the line of the virtual wall unit, EndPt is ending point of the virtual wall unit, and Dir is the direction vector of the virtual wall unit. A vertical normal of the line which is vertical to the line is made along a middle point of the line of the virtual wall unit, and the direction of the line from the starting point to the ending point of the virtual wall unit is defined. If the direction of the normal is clockwise with respect to the direction of the line, Dir is defined as positive; otherwise, Dir is defined as negative. That is, Dir is the unit vector which passes through the ending point of the line and is perpendicular to the line.

The virtual wall is a set of the virtual wall units, which is represented as $$W = \{\bar{w}_i | i \in N\}$$

It determines whether the movement path unit intersects the line corresponding to the preset virtual wall by, for a first example, determining whether the movement path unit and the virtual wall unit intersect, and for a second example, determining whether the movement path as a whole intersects the line corresponding to the preset virtual wall. In the second example, a first coordinate set of the movement path and a second coordinate set of the line corresponding to the preset virtual wall can be obtained, and whether there is an intersection of the first coordinate set and the second coordinate set is determined. If there is an intersection of the first coordinate set and the second coordinate set, it determines that the movement path intersects the line corresponding to the preset virtual wall.

It obtains the pass qualification information for identifying whether the robot is allowed to traverse the virtual wall. The pass qualification information may be represented as "1" or "0". As an example, if the pass qualification information is represented as "1", it indicates that the robot is allowed to traverse the virtual wall; otherwise, if the pass qualification information is represented as "0", it indicates that the robot is not allowed to traverse the virtual wall. The pass qualification information can also be represented as an arrow, and the direction of the arrow can be set in advance to represent the pass qualification of the robot.

S104: moving the robot to the ending position according to the movement path, if the pass qualification information identifies that the robot is allowed to traverse the virtual wall.

It obtains the pass qualification information. If the pass qualification information identifies that the robot is allowed to traverse the virtual wall, the robot is moved to the ending position according to the movement path.

Figure 5:
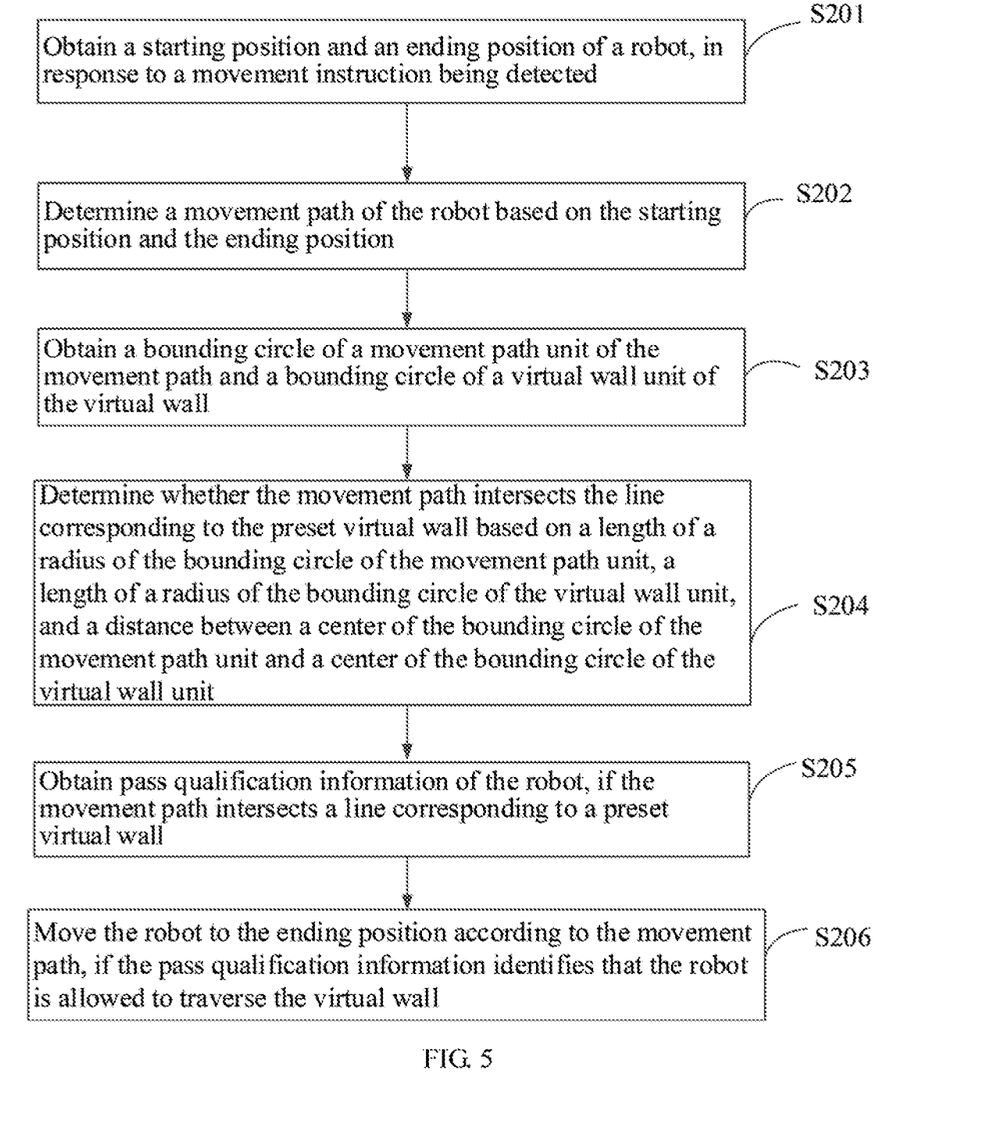
FIG. 5 is a flow chart of another embodiment of a movement control method for a robot according to the present disclosure.

FIG. 5 is a flow chart of another embodiment of a movement control method for a robot according to the present disclosure. In this embodiment, a movement control method for a robot is provided. The difference between this embodiment and the previous embodiment is steps S203-S204. Steps S201~S202 of this embodiment are the same as steps S101~S102 of the previous embodiment, step S206 of this embodiment is the same as step S104 of the previous embodiment, and step S205 of this embodiment is the same as step S103 of the previous embodiment. As shown in FIG. 5, steps S203~S205 of this embodiment are as follows.

S203: obtaining a bounding circle of a movement path unit of the movement path and a bounding circle of a virtual wall unit of the virtual wall, where the bounding circle of the movement path unit is centered on a center point of the movement path unit and takes a length of the movement path unit as a diameter, and the bounding circle of the virtual wall unit is centered on a center point of the virtual wall unit and takes a length of the virtual wall unit as a diameter.

It uses a bounding box interference checking method to determine whether the movement path intersects the line corresponding to the preset virtual wall. The bounding box interference checking method gradually approximates the geometric model of an object by establishing the object's bounding boxes, thereby using the bounding boxes that has bigger size while simple in shape to substitute the complex geometric object in a collision interference check. The non-intersecting basic geometric elements are quickly eliminated by the intersection tests between the bounding boxes to reduce the amount of the intersection tests. If the bounding boxes do not intersect, no interference will occur.

In this embodiment, the bounding box is the bounding circle. If the bounding circle of the movement path unit and the bounding circle of the virtual wall unit do not intersect, the two bounding circles do not interfere, that is, the movement path unit and the virtual wall unit are impossible to intersect. It takes a center point of the movement path unit as an origin and the length of the movement path unit as the diameter to generate the bounding circle of the movement path unit. In which, the movement path is represented in the form of a point set, and the point set is divided to obtain the movement path unit. It takes a center point of the virtual wall unit as an origin, and takes the length of the virtual wall unit as the diameter to generate the bounding circle of the virtual wall unit. The bounding circle of the movement path unit and the bounding circle of the virtual wall unit are obtained. In which, the virtual wall is represented in the form of a point set, and the point set is divided to obtain the virtual wall unit.

S204: determining whether the movement path intersects the line corresponding to the preset virtual wall based on a length of a radius of the bounding circle of the movement path unit, a length of a radius of the bounding circle of the virtual wall unit, and a distance between a center of the bounding circle of the movement path unit and a center of the bounding circle of the virtual wall unit.

It calculates the distance between the center of the bounding circle of each movement path unit and the center of the bounding circle of all the virtual wall units, and determines whether the distance between the centers is larger than the sum of the radius of the bounding circle of the current movement path unit and the radius of the bounding circle of the current virtual wall unit.

If the distance between the centers is larger than the sum of the radius of the bounding circle of the current movement path unit and the radius of the bounding circle of the current virtual wall unit, there is no possibility to have an intersection between the current movement path unit and the current virtual wall unit. Otherwise, if the distance between the centers is smaller than the sum of the radius of the bounding circle of the current movement path unit and the radius of the bounding circle of the current virtual wall unit, there is a possibility to have an intersection between the current movement path unit and the current virtual wall unit, and at this time, it further determines whether there is an intersection point between the current movement path unit and the current virtual wall unit, obtains a coordinate information set of the current movement path unit and a coordinate information set of the current virtual wall unit, and determines whether there is an intersection between the coordinate information set of the current movement path unit and the coordinate information set of the current virtual wall unit. If there is an intersection, there is an intersection point between the current movement path unit and the current virtual wall unit. If there is an intersection point between the current movement path unit and the current virtual wall unit, it indicates that the movement path intersects the line corresponding to the preset virtual wall.

S205: obtaining pass qualification information of the robot, if the movement path intersects a line corresponding to a preset virtual wall, where the preset virtual wall is for separating a preset working area from a non-working area, and the pass qualification information is for identifying whether the robot is allowed to traverse the virtual wall.

In this embodiment, step S205 is the same as step S103 of the previous embodiment. For details, refer to the related description in step S103 of the previous embodiment.

Figure 6:
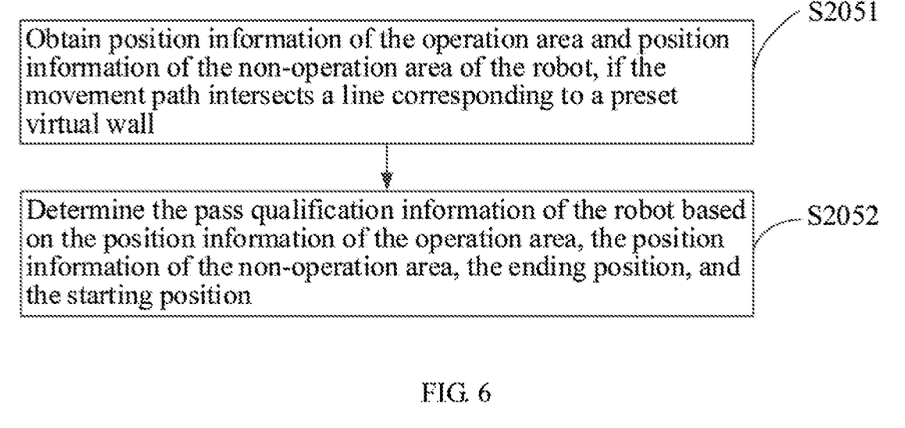
FIG. 6 is a flow chart of an example of step S205 of the movement control method of FIG. 5.

FIG. 6 is a flow chart of an example of step S205 of the movement control method of FIG. 5. As shown in FIG. 6, in this embodiment, step S205 may include steps S2051-S2052 as follows.

S2051: obtaining position information of the working area and position information of the non-working area of the robot, if the movement path intersects a line corresponding to a preset virtual wall.

It can set the working area and the non-working area in advance according to a user instruction. The working area is an area that allows the robot to enter during an operation process, while the non-working area is an area that does not allow the robot to enter during the operation process. It can set the working area and non-working area by setting a restricted area on a map. Alternatively, it can also set the virtual wall to rule the movement of the robot, and then divide the working area and the non-working area by setting that the robot is not allowed to traverse the virtual wall.

If the movement path intersects the line corresponding to the preset virtual wall, position information of the working area and position information of the non-working area of the robot are obtained. In which, the position information may include coordinate information, an area, or the like.

S2052: determining the pass qualification information of the robot based on the position information of the working area, the position information of the non-working area, the ending position, and the starting position, where the pass qualification information identifies that the robot is allowed to traverse the virtual wall when the ending position is in the working area and the starting position is in the non-working area.

It determines the passage qualification information of the robot based on the position information of the working area, the position information of the non-working area, the ending position, and the starting position. Since the robot will not be moved to the non-working area during a normal operation, if the obtained current position of the robot is in the non-working area, it indicates that the accuracy of the position information may have been affected due to the measurement errors of the sensor or changes in the working environment, or indicates that the robot is manually moved to the non-working area. Therefore, the robot needs to traverse the virtual wall and return to the working area for performing normal operations only when the starting position of the robot is in the non-working area. Hence, when the ending position is within the working area and the starting position is within the non-working area, it is determined that the pass qualification information identifies that the robot is allowed to traverse the virtual wall.

Figure 7:
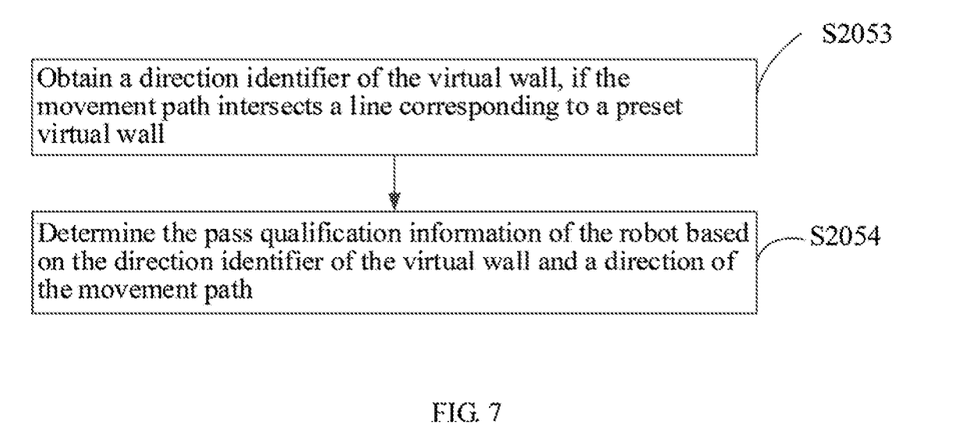
FIG. 7 is a flow chart of another example of step S205 of the movement control method of FIG. 5.

Furthermore, in another embodiment, in order to obtain the pass qualification information of the robot, step S205 may include steps S2053~S2054. In which, step S2051~S2052 and step S2053~S2054 are exclusive and should be executed alternatively. FIG. 7 is a flow chart of another example of step S205 of the movement control method of FIG. 5. As shown in FIG. 7, steps S2053-S2054 are as follows.

S2053: obtaining a direction identifier of the virtual wall, if the movement path intersects a line corresponding to a preset virtual wall, where the direction identifier of the virtual wall is for directing the robot to traverse the virtual wall, and the direction identifier represents from the non-working area to the working area.

It determines whether the movement path intersects the line corresponding to the preset virtual wall, and obtains the direction identifier of the virtual wall if the movement path intersects the line corresponding to the preset virtual wall. The direction identifier of the virtual wall is the direction vector of the virtual wall unit, which is a unit vector perpendicular to the line of the virtual wall unit. The direction identifier of the virtual wall is for directing the robot to traverse the virtual wall. Since the robot can only return to the working area from the non-working area while cannot traverse the virtual wall from the working area to the non-working area, the direction identifier of the virtual wall represents a direction from the non-working area to the working area.

Furthermore, in one embodiment, the direction identifier of the virtual wall may be set in advance according to a user instruction. Accordingly, before step S2053, the method may further include: receiving a virtual wall direction identifier setting instruction; and setting the direction identifier of the virtual wall based on the virtual wall direction setting instruction.

It receives the virtual wall direction identifier setting instruction. In which, the virtual wall direction identifier setting instruction includes information of the direction identifier of the virtual wall. The virtual wall direction identifier setting instruction can be input by the user, or be remotely received. The user can generate the virtual wall direction identifier setting instruction by directly drawing out the direction through a brush on a virtual map. In the setting process of the user, the working area and the non-working area can be display on the virtual map so as to remind the user.

It sets the direction identifier of the virtual wall according to the received virtual wall direction identifier setting instruction, where it can set the unit vector for each virtual wall unit.

Furthermore, in another embodiment, it can set the direction identifier of the virtual wall in advance based on the information of the working area and the information of the non-working area. Accordingly, before step S2053, the method may further include: setting the direction identifier of the virtual wall based on orientation information between the working area and the non-working area.

Since the direction identifier of the virtual wall is the direction vector of the virtual wall unit which is a unit vector perpendicular to the line of the virtual wall unit, the direction identifier of the virtual wall is for directing the robot to traverse the virtual wall, and the robot can only return the working area from the non-working area while it cannot traverse the virtual wall from the working area to the non-working area, the direction identifier of the virtual wall represents a direction from the non-working area to the working area. It obtains orientation information between the non-working area and the working area. In which, the orientation information between the non-working area and the working area refers to a relative positional relationship between the two, for example, the non-working area is on the left side of the working area, and the direction identifier of the virtual wall represents a direction from the non-working area to the working area, the direction identifier of the virtual wall is perpendicular to the virtual wall unit and directs to the right side, that is, front the non-working area to the working area.

S2054: determining the pass qualification information of the robot based on the direction identifier of the virtual wall and a direction of the movement path, where the pass qualification information identities that the robot is allowed to traverse the virtual wall when the direction identifier of the virtual wall and the direction of the movement path meet a preset condition.

It determines the passage qualification information of the robot based on the direction identifier of the virtual wall and the direction of the movement path. If the direction identifier of the virtual wall and the direction of the movement path meet the preset condition, the pass qualification information identifies that the robot is allowed to traverse the virtual wall when.

In which, since the movement path of the robot must be from the non-working area to the working area when an included angle between the direction vector of the virtual wall unit and the direction vector of the movement path unit which are intersected is less than 90 degrees, the preset condition may be set as that the included angle between the direction vector of the virtual wall unit and the direction vector of the movement path unit which are intersected is less than 90 degrees. The pass qualification information identifies that the robot is allowed to traverse the virtual wall when the included angle between the direction vector of the virtual wall unit and the direction vector of the movement path unit which are intersected is determined to be less than 90 degrees; and the pass qualification information identifies that the robot is not allowed to traverse the virtual wall when the included angle between the direction vector of the virtual wall unit and the direction vector of the movement path unit which are intersected is determined to be larger than 90 degrees.

It should be understood that, the sequence of the serial number of the steps in the above-mentioned embodiments does not mean the execution order while the execution order of each process should be determined by its function and internal logic, which should not be taken as any limitation to the implementation process of the embodiments.

FIG. 8 is a schematic block diagram of an embodiment of a movement control apparatus for a robot according to the present disclosure. A movement control apparatus 8 for a robot as shown in FIG. 9 that has a positioning device is provided. Each unit included in the robot is for performing the steps in the embodiments corresponding to FIG. 1-FIG. 7. For details, please refer to the related description in the corresponding embodiments of FIG. 1 to FIG. 7. For the convenience of explanation, only the parts related to this embodiment are shown. As shown in FIG. 8, the movement control apparatus 8 includes:

a first obtaining unit 810 configured to obtain a starting position and an ending position of the robot, in response to a movement instruction being detected, where the starting position is obtained via the positioning device of the robot;

a determination unit 820 configured to determine a movement path of the robot based on the starting position and the ending position;

a second obtaining unit 830 configured to obtain pass qualification information of the robot, if the movement path intersects a line corresponding to a preset virtual wall, where the preset virtual wall is for separating a preset working area from a non-working area, and the pass qualification information is for identifying whether the robot is allowed to traverse the virtual wall; and a movement unit 840 configured to move the robot to the ending position according to the movement path, if the pass qualification information identifies that the robot is allowed to traverse the virtual wall.

Furthermore, the movement control apparatus 8 for a robot further includes:

a third obtaining unit configured to obtaining a bounding circle of a movement path unit of the movement path and a bounding circle of a virtual wall unit of the virtual wall, where the bounding circle of the movement path unit is centered on a center point of the movement path unit and takes a length of the movement path unit as a diameter, and the bounding circle of the virtual wall unit is centered on a center point of the virtual wall unit and takes a length of the virtual wall unit as a diameter; and a second determination unit configured to determine whether the movement path intersects the line corresponding to the preset virtual wall based on a length of a radius of the bounding circle of the movement path unit, a length of a radius of the bounding circle of the virtual wall unit, and a distance between a center of the bounding circle of the movement path unit and a center of the bounding circle of the virtual wall unit.

Furthermore, the second obtaining unit 830 is configured to:

obtain position information of the working area of the robot and position information of the non-working area of the robot, if the movement path intersects a line corresponding to a preset virtual wall; and determine the pass qualification information of the robot based on the position information of the working area, the position information of the non-working area of the robot, the starting position, and the ending position, where the pass qualification information identifies the robot being allowed to traverse the virtual wall when the ending position is in the working area.

Furthermore, the second obtaining unit 830 is configured to:

obtain a direction identifier of the virtual wall, if the movement path intersects a line corresponding to a preset virtual wall, where the direction identifier of the virtual wall is for directing the robot to traverse the virtual wall, and the direction identifier represents from the non-working area to the working area; and determine the pass qualification information of the robot based on the direction identifier of the virtual wall and a direction of the movement path, where the pass qualification information identifies the robot being allowed to traverse the virtual wall when the direction identifier of the virtual wall and the direction of the movement path meet a preset condition.

Furthermore, the movement control apparatus 8 for a robot further includes:

a first setting unit configured to receive a virtual wall direction identifier setting instruction and set the direction identifier of the virtual wall based on the virtual wall direction setting instruction.

Furthermore, the movement control apparatus 8 for a robot further includes:

a second setting unit configured to set the direction identifier of the virtual wall based on orientation information between the working area and the non-working area.

In this embodiment, the first obtaining unit 810, the determination unit 820, the second obtaining unit 830, and the movement unit 840 are implemented in the form of software, which can be computer program(s) stored in a memory of the movement control apparatus 8 and executable on a processor of the movement control apparatus 8. In other embodiments, the first obtaining unit 810, the determination unit 820, the second obtaining unit 830, and the movement unit 840 may be implemented in the form of hardware (e.g., a circuit of the movement control apparatus 8 which is coupled to the processor of the movement control apparatus 8) or a combination of hardware and software (e.g., a circuit with a single chip microcomputer).

FIG. 9 is a schematic block diagram of an embodiment of a robot according to the present disclosure. A robot 9 is provided. As shown in FIG. 9, in this embodiment, the robot 9 includes a processor 90, a storage 91, a computer program 92, and a positioning device 93. The computer program 92 is stored in the storage 91 and executable on the processor 90, for example, a robot control program. When executing (instructions in) the computer program 92, the processor 90 implements the steps in the above-mentioned embodiments of the movement control method for a robot, for example, steps S101-S104 shown in FIG. 1. Alternatively, when the processor 90 executes the (instructions in) computer program 92, the functions of each module/unit in the above-mentioned device embodiments, for example, the functions of the modules 810-840 shown in FIG. 8 are implemented.

Exemplarily, the computer program 92 may be divided into one or more modules/units, and the one or more modules/units are stored in the storage 91 and executed by the processor 90 to realize the present disclosure. The one or more modules/units may be a series of computer program instruction sections capable of performing a specific function, and the instruction sections are for describing the execution process of the computer program 92 in the robot 9. For example, computer program 92 can be divided into a first obtaining unit, a determination unit, a second obtaining unit, and a movement unit.

The first obtaining unit is configured to obtain a starting position and an ending position of the robot, in response to a movement instruction being detected, where the starting position is obtained via the positioning device of the robot.

The determination unit is configured to determine a movement path of the robot based on the starting position and the ending position.

The second obtaining unit is configured to obtain pass qualification information of the robot, if the movement path intersects a line corresponding to a preset virtual wall, where the preset virtual wall is for separating a preset working area form a non-working area, and the pass qualification information is for identifying whether the robot is allowed to traverse the virtual wall.

The movement unit is configured to move the robot to the ending position according to the movement path, if the pass qualification information identifies that the robot is allowed to traverse the virtual wall.

The robot 9 may include, but is not limited to, a processor 90 and a storage 91. It can be understood by those skilled in the art that FIG. 9 is merely an example of the robot 9 and does not constitute a limitation on the robot 9, and may include more or fewer components than those shown in the figure, or a combination of some components or different components. For example, the robot 9 may further include an input/output device a network access device, a bus, and the like.

The processor 90 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 91 may be an internal storage unit of the robot 9, for example, a hard disk or a memory of the robot 9. The storage 91 may also be an external storage device of the robot 9, for example a plug-in hard disk, a smart media card (SMC), a secure digital (SD) card, flash card, and the like, which is equipped on the robot 9. Furthermore, the storage 91 may further include both an internal storage unit and an external storage device, of the robot 9. The storage 91 is configured to store the computer program 92 and other programs and data required by the robot 9. The storage 91 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned in unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented movement control method for a robot having a positioning device, comprising executing on a processor the steps of:
    obtaining a starting position and an ending position of the robot, in response to a movement instruction being detected, wherein the starting position is obtained via the positioning device of the robot;
    determining a movement path of the robot based on the starting position and the ending position;
    obtaining pass qualification information of the robot in response to the movement path intersecting a line corresponding to a preset virtual wall, wherein the preset virtual wall is for separating a preset working area from a non-working area, and the pass qualification information is for identifying whether the robot is allowed to traverse the virtual wall; and
    moving the robot to the ending position according to the movement path in response to the pass qualification information identifying the robot being allowed to traverse the virtual wall;
    wherein the step of obtaining pass qualification information of the robot in response to the movement path intersecting a line corresponding to a preset virtual wall comprises:
    obtaining a bounding circle of a movement path unit of the movement path and a bounding circle of a virtual wall unit of the virtual wall, wherein the bounding circle of the movement path unit is centered on a center point of the movement path unit and takes a length of the movement path unit as a diameter, and the bounding circle of the virtual wall unit is centered on a center point of the virtual wall unit and takes a length of the virtual wall unit as a diameter; and
    determining whether the movement path intersects the line corresponding to the preset virtual wall based on a length of a radius of the bounding circle of the movement path unit, a length of a radius of the bounding circle of the virtual wall unit, and a distance between a center of the bounding circle of the movement path unit and a center of the bounding circle of the virtual wall unit.

2. The method of claim 1, wherein the step of obtaining pass qualification information of the robot in response to the movement path intersecting a line corresponding to a preset virtual wall comprises:
    obtaining position information of the working area of the robot and position information of the non-working area of the robot, in response to the movement path intersecting a line corresponding to a preset virtual wall; and
    determining the pass qualification information of the robot based on the position information of the working area, the position information of the non-working area of the robot, the starting position, and the ending position, wherein the pass qualification information identifies the robot being allowed to traverse the virtual wall when the ending position is in the working area.

3. The method of claim 1, wherein the step of obtaining pass qualification information of the robot in response to the movement path intersecting a line corresponding to a preset virtual wall comprises:
    obtaining a direction identifier of the virtual wall in response to the movement path intersecting a line corresponding to a preset virtual wall, wherein the direction identifier of the virtual wall is for directing the robot to traverse the virtual wall, and the direction identifier represents from the non-working area to the working area; and
    determining the pass qualification information of the robot based on the direction identifier of the virtual wall and a direction of the movement path, wherein the pass qualification information identifies the robot being allowed to traverse the virtual wall when the direction identifier of the virtual wall and the direction of the movement path meet a preset condition.

4. The method of claim 3, wherein before the step of obtaining the direction identifier of the virtual wall in response to the movement path intersecting the line corresponding to the preset virtual wall comprises:
    receiving a virtual wall direction identifier setting instruction; and
    setting the direction identifier of the virtual wall based on the virtual wall direction setting instruction.

5. The method of claim 3, wherein before the step of obtaining the direction identifier of the virtual wall in response to the movement path intersecting the line corresponding to the preset virtual wall comprises:
    setting the direction identifier of the virtual wall based on orientation information between the working area and the non-working area.

6. The method of claim 1, wherein the movement instruction comprises the ending position, and the ending position is obtained from the movement instruction.

7. The method of claim 1, wherein the movement path unit comprises a starting point, an ending point, and a direction vector.

8. A movement control apparatus for a robot having a positioning device, comprising:
    a first obtaining unit configured to obtain a starting position and an ending position of the robot, in response to a movement instruction being detected, wherein the starting position is obtained via the positioning device of the robot;
    a determination unit configured to determine a movement path of the robot based on the starting position and the ending position;
    a second obtaining unit configured to obtain pass qualification information of the robot in response to the movement path intersecting a line corresponding to a preset virtual wall, wherein the preset virtual wall is for separating a preset working area from a non-working area, and the pass qualification information is for identifying whether the robot is allowed to traverse the virtual wall;
    a movement unit configured to move the robot to the ending position according to the movement path in response to the pass qualification information identifying the robot being allowed to traverse the virtual wall;

a third obtaining unit configured to obtain a bounding circle of a movement path unit of the movement path and a bounding circle of a virtual wall unit of the virtual wall, wherein the bounding circle of the movement path unit is centered on a center point of the movement path unit and takes a length of the movement path unit as a diameter, and the bounding circle of the virtual wall unit is centered on a center point of the virtual wall unit and takes a length of the virtual wall unit as a diameter; and a second determination unit configured to determine whether the movement path intersects the line corresponding to the preset virtual wall based on a length of a radius of the bounding circle of the movement path unit, a length of a radius of the bounding circle of the virtual wall unit, and a distance between a center of the bounding circle of the movement path unit and a center of the bounding circle of the virtual wall unit.

9. The apparatus of claim 8, wherein the second obtaining unit is configured to:

obtain position information of the working area of the robot and position information of the non-working area of the robot, in response to the movement path intersecting a line corresponding to a preset virtual wall; and determine the pass qualification information of the robot based on the position information of the working area, the position information of the non-working area of the robot, the starting position, and the ending position, wherein the pass qualification information identifies the robot being allowed to traverse the virtual wall when the ending position is in the working area.

10. The apparatus of claim 8, wherein the second obtaining unit is configured to:

obtain a direction identifier of the virtual wall in response to the movement path intersecting a line corresponding to a preset virtual wall, wherein the direction identifier of the virtual wall is for directing the robot to traverse the virtual wall, and the direction identifier represents from the non-working area to the working area; and determine the pass qualification information of the robot based on the direction identifier of the virtual wall and a direction of the movement path, wherein the pass qualification information identifies the robot being allowed to traverse the virtual wall when the direction identifier of the virtual wall and the direction of the movement path meet a preset condition.

11. The apparatus of claim 10, further comprising:

a first setting unit configured to receive a virtual wall direction identifier setting instruction and set the direction identifier of the virtual wall based on the virtual wall direction setting instruction.

12. The apparatus of claim 10, further comprising:

a second setting unit configured to set the direction identifier of the virtual wall based on orientation information between the working area and the non-working area.

13. A robot comprising:

a positioning device;
a memory;
a processor; and
one or more computer programs stored in the memory and executable on the processor, wherein the one or more computer programs comprise:

instructions for obtaining a starting position and an ending position of the robot, in response to a movement instruction being detected, wherein the starting position is obtained via the positioning device of the robot;

instructions for determining a movement path of the robot based on the starting position and the ending position;

instructions for obtaining pass qualification information of the robot in response to the movement path intersecting a line corresponding to a preset virtual wall, wherein the preset virtual wall is for separating a preset working area from a non-working area, and the pass qualification information is for identifying whether the robot is allowed to traverse the virtual wall; and instructions for moving the robot to the ending position according to the movement path in response to the pass qualification information identifying the robot being allowed to traverse the virtual wall;

wherein the instructions for obtaining pass qualification information of the robot in response to the movement path intersecting a line corresponding to a preset virtual wall comprise:

instructions for obtaining a bounding circle of a movement path unit of the movement path and a bounding circle of a virtual wall unit of the virtual wall, wherein the bounding circle of the movement path unit is centered on a center point of the movement path unit and takes a length of the movement path unit as a diameter, and the bounding circle of the virtual wall unit is centered on a center point of the virtual wall unit and takes a length of the virtual wall unit as a diameter; and instructions for determining whether the movement path intersects the line corresponding to the preset virtual wall based on a length of a radius of the bounding circle of the movement path unit, a length of a radius of the bounding circle of the virtual wall unit, and a distance between a center of the bounding circle of the movement path unit and a center of the bounding circle of the virtual wall unit.

14. The robot of claim 13, wherein the instructions for obtaining pass qualification information of the robot in response to the movement path intersecting a line corresponding to a preset virtual wall comprise:

instructions for obtaining position information of the working area of the robot and position information of the non-working area of the robot, in response to the movement path intersecting a line corresponding to a preset virtual wall; and instructions for determining the pass qualification information of the robot based on the position information of the working area, the position information of the non-working area of the robot, the starting position, and the ending position, wherein the pass qualification information identifies the robot being allowed to traverse the virtual wall when the ending position is in the working area.

15. The robot of claim 13, wherein the instructions for obtaining pass qualification information of the robot in response to the movement path intersecting a line corresponding to a preset virtual wall comprise:

instructions for obtaining a direction identifier of the virtual wall in response to the movement path intersecting a line corresponding to a preset virtual wall, wherein the direction identifier of the virtual wall is for directing the robot to traverse the virtual wall, and the direction identifier represents from the non-working area to the working area; and instructions for determining the pass qualification information of the robot based on the direction identifier of the virtual wall and a direction of the movement path, wherein the pass qualification information identifies the robot being allowed to traverse the virtual wall when the direction identifier of the virtual wall and the direction of the movement path meet a preset condition.

16. The robot of claim 15, wherein the one or more computer programs further comprise:
   instructions for receiving a virtual wall direction identifier setting instruction; and
   instructions for setting the direction identifier of the virtual wall based on the virtual wall direction setting instruction.

17. The robot of claim 15, wherein the one or more computer programs further comprise:
   instructions for setting the direction identifier of the virtual wall based on orientation information between the working area and the non-working area.

18. The robot of claim 13, wherein the movement instruction comprises the ending position, and the ending position is obtained from the movement instruction.

19. The robot of claim 13, wherein the movement path unit comprises a starting point, an ending point, and a direction vector.

\* \* \* \* \*